Feb. 14, 1956

H. J. PEO 2,734,483

FLEA REPELLING ANIMAL COLLAR

Filed March 11, 1953

INVENTOR.
HOWARD J. PEO

BY Harold E. Stonebraker his ATTORNEY

United States Patent Office 2,734,483
Patented Feb. 14, 1956

2,734,483

FLEA REPELLING ANIMAL COLLAR

Howard J. Peo, Irondequoit, N. Y.

Application March 11, 1953, Serial No. 341,759

2 Claims. (Cl. 119—160)

This invention relates to a flea repelling collar and method of producing the same and has for its purpose to provide a collar attachable around the neck of a dog and which effectively kills or repels fleas and keeps the body of the dog substantially free of fleas.

The invention has for a more particular object to provide a porous or fabric collar which can be easily and conveniently secured to the neck of a dog and is impregnated with a substance that successfully kills or repels fleas.

A further purpose of the invention is to afford a loosely woven tubular fabric collar that is filled with a material containing a flea killing or repelling substance.

Still an additional purpose of the invention is to afford a method by which such a collar can be produced in a practical, economical and efficient manner so as to impregnate it with a flea killing or repelling substance and render it serviceable for from three to seven weeks or more.

To these and other ends, the invention consists in the construction and method that will appear clearly from the following description when read in conjunction with the accompanying drawings, the novel features being pointed out in the claims following the specification.

Figure 1:
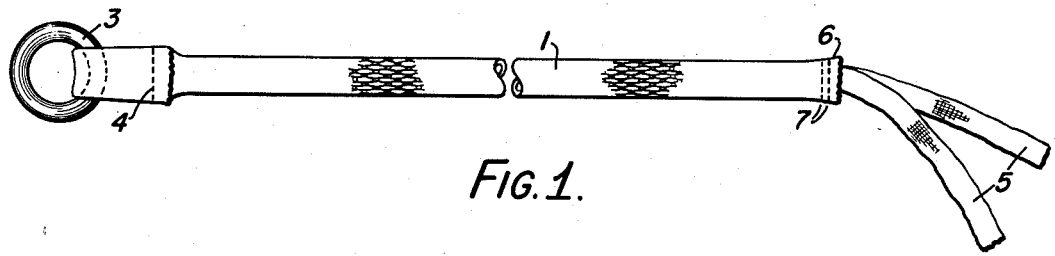
Fig. 1 is a view in side elevation of a structure made in accordance with a preferred embodiment of the invention.
Figure 2:
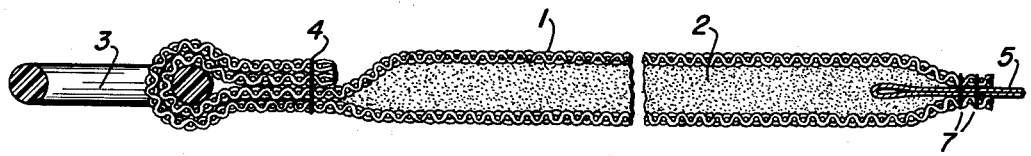
Fig. 2 is a longitudinal central sectional view of the same.
Figure 3:
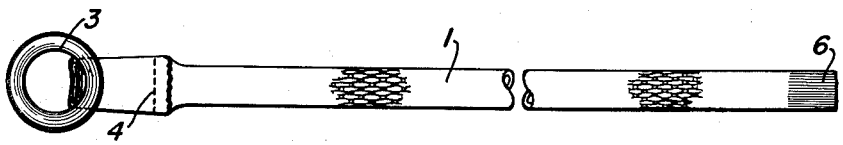
Fig. 3 is a sectional view illustrating the first step in manufacturing the device.
Figure 4:
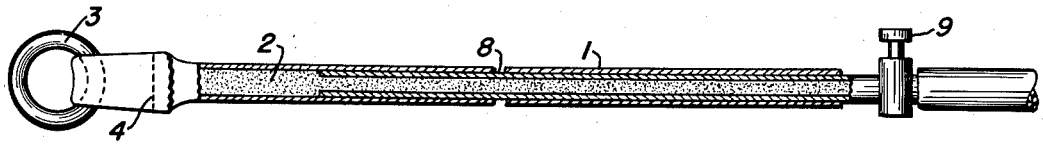
Fig. 4 is a sectional view illustrating the second step of manufacture, during which the flea killing or repelling material is inserted into the collar.
Figure 5:
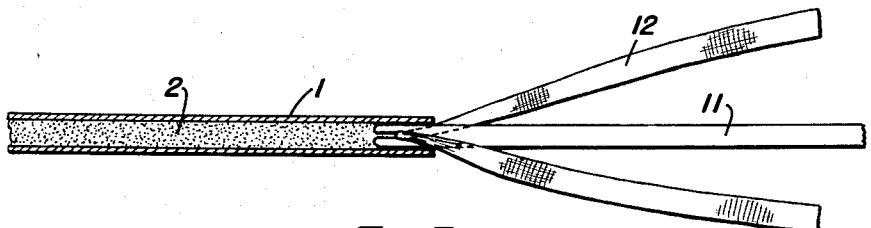
Fig. 5 is a sectional view illustrating the final step in the manufacture of the device during which the tying elements are attached to one end thereof.

Referring more particularly to the drawings in which like reference numerals refer to the same parts throughout the several views, 1 designates the body of the collar consisting preferably of an elongated slender tube of loosely woven cotton webbing or other suitable porous material that is filled and impregnated with an inert material such as talcum powder of approximately 320 mesh as indicated at 2 and containing a flea repelling or flea killing substance. A material that has been found satisfactory and most efficient for the purpose consists of a gamma isomer of benzene hexachloride from lindane in the proportion of approximately 1% by weight of the total volume of inert material.

The tubular body 1 preferably consists of a loosely woven cotton webbing of from five to twelve picks per inch, the most satisfactory results having been obtained with about eight picks to the inch. The tube preferably has an outer diameter of approximately 3/8" and is provided at one end with a ring 3 of plastic or metal, the tube extending through the ring 3 and folded upon itself affording a double thickness that is stitched at 4 to close one end, while 5 designates tying elements secured within the opposite end of the tube which is suitably sealed by wax as indicated at 6 and stitched at 7 to hold the tying elements 5 securely in place.

The body of the tube which is preferably approximately 17" in length is attached around the neck of a dog and conveniently secured by passing the tying elements and the end of the collar to which they are attached through the ring 3, and then fastening the tying elements or tapes 5 to the adjacent portion of the body of the collar. When thus positioned, the collar will effectively result in the disappearance of from 70% to 80% of any fleas that may be present on the body of the dog when the collar is attached.

Such a collar can be produced from a flat loosely woven tube of cotton webbing having approximately eight picks to the inch which is cut to the desired length, and one end is dipped in or suitably saturated with wax to prevent unraveling, while the opposite end of the tube is passed through the ring 3 and folded upon itself to receive stitching 4 and thus closed at the end with the ring 3 permanently fastened. Following this, the open or waxed end of the tube is inserted over a metal tube 8 which is connected with a suitable source under pressure of the inert material such as talcum powder of 320 mesh and containing the flea killing or repellant substance such as a gamma isomer of benzene hexachloride from lindane. The powdered filler under pressure is permitted to enter the fabric tube 1 by opening a suitable valve 9, the tube 1 being removed from the metal tube 8 as the powdered filler is forced under pressure into the tube 1, and the valve 9 is closed as the tube 1 is entirely withdrawn from the metal tube 8, after which the open end of tube 1 is stretched over a suitable metal form or holder 11 that receives a tape 12 which may be unwound from a coil. The tape 12 is inserted through the holder 11 after which the tube 1 is stretched over the holder 11 and folded end of the tape, which is then severed to the proper length required. The tube 1 is then removed from the metal holder 11 with the doubled portion of tape 12 arranged within the tube 1, following which the end of the tube with the tape 12 arranged therein is suitably stitched to close the tube and to secure the tape 12, affording the tying elements 5 already described.

This procedure results in a loosely woven fabric closed at both ends and filled with an inert material containing an effective flea killing or repelling substance which saturates and impregnates the pores of the tube and is effective to kill or drive away from th body of a dog any fleas that may be present, without injuring or harming the dog in any way. The collar is closed at both ends to prevent loss of the powdered inert material with its contained flea repellant substance, and can be readily attached around the neck of a dog, being effective usually for a period of from three to seven weeks or more, depending on the season of the year and degree of heat, after which the collar is discarded and a fresh one positioned on the dog.

While the invention has been described with reference to the particular structure and method herein disclosed, this application is not confined to the details set forth and is intended to cover such modifications or departures as may come within the purposes of the improvement or the scope of the following claims.

I claim:

1. A disposable flea repellant animal collar comprising a flexible one-piece loosely woven fabric tube having both ends closed and containing a flea repelling powder, a ring on one end of said tube and tying string elements on the other end of said tube, whereby said tube may be placed about an animal's neck, the string end extended through said ring and the string end securely fastened to said tube by said string elements.

2. A disposable flea repellant animal collar comprising a flexible one-piece loosely woven fabric tube having both ends closed and containing a flea repelling powder comprising a gamma isomer of benzene hexachloride from lindane, a ring on one end of said tube and tying string elements on the other end of said tube, whereby said tube may be placed about an animal's neck, the string end extended through said ring and the string end securely fastened to said tube by said string elements.

References Cited in the file of this patent
UNITED STATES PATENTS

| | | |
|---|---|---|
| 1,353,210 | Bates | Sept. 21, 1920 |
| 1,588,649 | Bates | June 15, 1926 |
| 2,224,753 | Yates | Dec. 10, 1940 |
| 2,342,066 | Tramill | Feb. 15, 1944 |
| 2,349,713 | Finch | May 23, 1944 |
| 2,401,253 | Lamb, Jr. | May 28, 1946 |
| 2,586,761 | Eskola | Feb. 19, 1952 |